United States Patent [19]

Burghardt

[11] Patent Number: 4,610,439
[45] Date of Patent: Sep. 9, 1986

[54] SERVICE SADDLE U-BOLT INSTALLATION HOLDER

[76] Inventor: Stanley M. Burghardt, 94-20 Plattwood Ave., Ozone Park, N.Y. 11417

[21] Appl. No.: 695,197

[22] Filed: Jan. 25, 1985

Related U.S. Application Data

[62] Division of Ser. No. 531,430, Sep. 12, 1983, Pat. No. 4,519,124.

[51] Int. Cl.⁴ .............................................. B25B 3/00
[52] U.S. Cl. ........................................ 269/3; 269/46; 269/98; 269/249; 138/99
[58] Field of Search .................. 269/3, 97, 98, 249, 269/46, 1; 405/154; 294/19.1, 103.1; 138/97–99

[56] References Cited

U.S. PATENT DOCUMENTS

| | | | |
|---|---|---|---|
| 847,594 | 3/1907 | McCreary | 138/99 |
| 3,017,174 | 1/1962 | Reuter | 269/97 |
| 3,117,904 | 1/1964 | Black | 138/99 X |
| 3,178,793 | 4/1965 | Rosengarten, Jr. et al. | 138/99 X |
| 3,487,857 | 1/1970 | Lee | 138/99 |
| 3,583,694 | 6/1971 | Davies | 269/98 |
| 3,601,835 | 8/1971 | Morgan | 294/19.1 X |

FOREIGN PATENT DOCUMENTS 5097 of 1913 United Kingdom .................. 269/98

Primary Examiner—Frederick R. Schmidt
Assistant Examiner—Steven P. Schad
Attorney, Agent, or Firm—Brooks Haidt Haffner & Delahunty

[57] ABSTRACT

A gas utility service saddle U-bolt installation holder comprises an elongated handle having a substantially L-shaped lower end and a clamp adapter attached to said L-shaped lower end for holding a U-bolt at a location substantially midway along its lengths with the U-bolt legs projecting upwardly so as to straddle a gas main from the underside of the main, the U-bolt clamp being channel-shaped to receive the U-bolt therein, and a thumb screw being provided through one of the upstanding legs of the channel shape to clamp the U-bolt against the opposite channel leg. Preferably, the U-bolt clamp is a separate clamp adapter having a pair of vertically spaced apart support arms by which it is mounted on conventional "lower tape holder" tool, using a second thumb screw to make such attachment. The method of using such a tool is described, involving positioning of the U-bolt beneath the gas main located within a deep, small-area excavation, with the legs of the U-bolt upright to receive a conventional crown saddle thereon.

2 Claims, 6 Drawing Figures

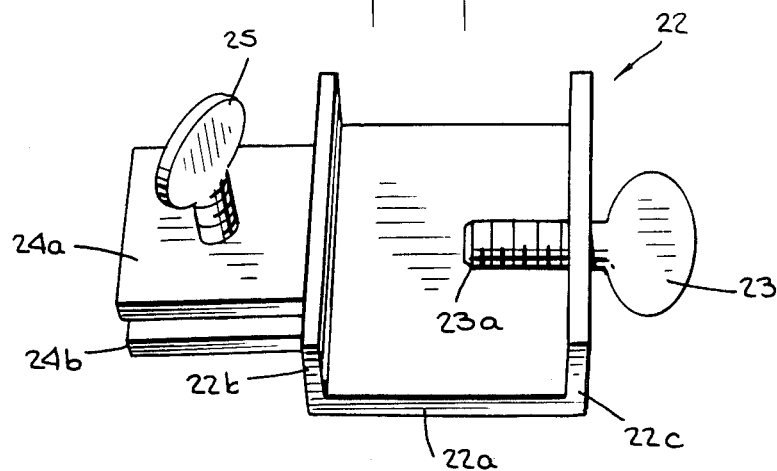
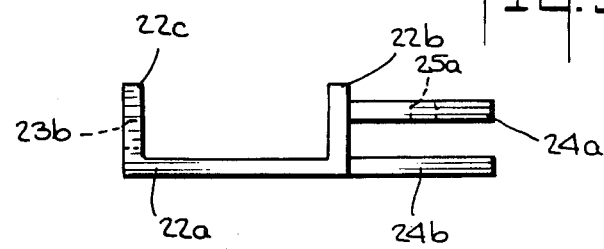
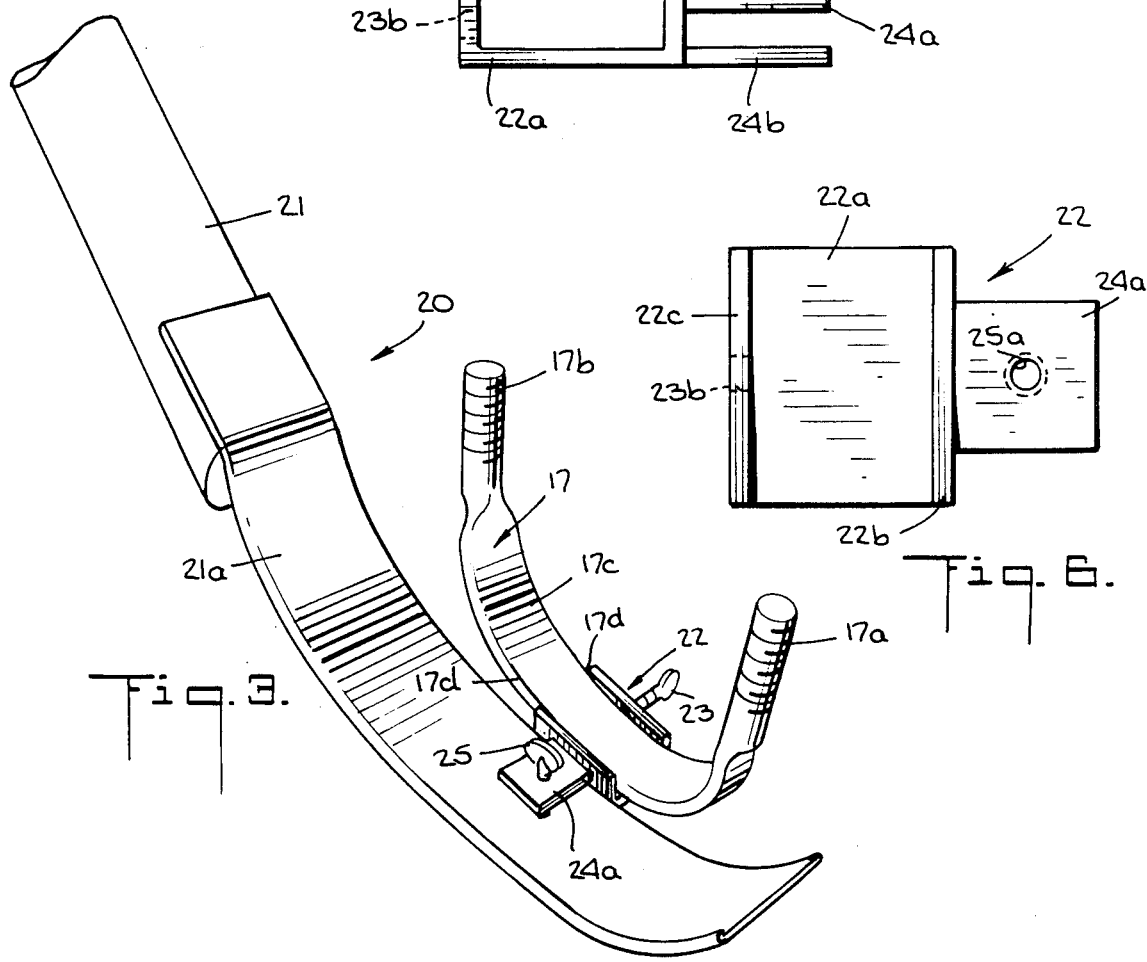

SERVICE SADDLE U-BOLT INSTALLATION HOLDER

This is a division of application Ser. No. 531,430 filed Sept. 12, 1983, now U.S. Pat. No. 4,519,124 issued 5/28/85.

FIELD OF THE INVENTION

This invention relates to specialized tools for use in servicing utility lines, and more particularly to a service saddle U-bolt installation holder used for such purposes. Although the invention was made and will therefore be described in connection with the servicing of gas utility lines, it may be useful for attaching service saddles on other utility lines, such as water mains.

BACKGROUND AND OBJECTS OF THE INVENTION

A recent trend in the repairing of gas utility service lines is towards so called "small hole" techniques by which underground repairs are conducted within relatively deep but small-area excavations within which the line to be repaired is exposed. The area of excavation is smaller than that which would permit a repairman to lower himself into the hole and, therefore, all of the necessary repairs must be performed standing at ground level and working with extension tools which extend downwardly to the pipe joint or conduit connection and are manipulatable while standing at ground level to effectuate the required removal or replacement of the connection between a gas service line and a gas main, for example. These "small hole" techniques avoid large size excavations which take longer to create and refill and, when left open overnight or unattended, pose dangers to the vehicular traffic and to pedestrians at the street locations where such repairs must be performed. The substantial costs and dangers in making the large size excavations are thereby reduced significantly.

Vacuum digging techniques have been developed by which relatively deep excavation having fairly small areas of opening can be made to reach the service line connection to the main for the required repair, after the street surface has been broken. In addition, a number of long-handled tools for making the repairs remotely while standing at ground level, and special techniques for manipulating such tools have been developed. However, when either capping a gas service using a plugged saddle or replacing the saddle of a riser-tee connection between a gas main and a service line, it has been found that the so-called "small hole" tools which have been developed are not useable to position and hold the U-bolt of the saddle beneath the main while the saddle is installed.

It is therefore intended by the present invention to provide a tool and a method for working from a standing position, at ground level, within a very narrow excavation, to manipulate a U-bolt into its required upright position, while holding it at a location beneath the exposed main, for the required attachment of the saddle thereto, which procedure is commonly used for removing or replacing an underground gas service line. The tool should be readily controllable from the above-ground location and, of course, must be effective to position and hold the U-bolt without undue difficulty.

BRIEF DESCRIPTION OF THE INVENTION

Briefly describing the invention in its preferred embodiment a specially adapted tool is provided for the purpose, having a clamping element for holding the U-bolt in the required upright position and an elongated handle element having a substantially L-shaped lower end to which the U-bolt clamp is attached. The length of the substantially horizontal leg of the L-shape is such that the extension handle is clear of one of the upwardly projecting legs of the U-bolt to which the handle is adjacent as it extends substantially in the same direction upwardly and out of the excavation to be held by the repairman working above. To avoid the necessity for adding another of such one-piece extension handle tools to the already numerous tools required to be carried on a repair truck, in its preferred embodiment the present invention provides a small, channel shaped clamp for receiving and holding the U-bolt, and which carries a laterally outward projecting clamp for attaching the U-bolt clamp to any of several long-handled tools already in the assemblage of tools carried by the repair truck, preferably a so called "lower tape holder" which has such a substantially L-shaped, though curved, lower end to which the clamp adapter can be conveniently attached to support the U-bolt in the intended upright position.

The U-bolt is held in the normally upwardly facing channel-shape clamp by a thumb screw which projects laterally through one of the upstanding legs of the U-shape and engages the U-bolt after it is positioned in the clamp. The attachment of the clamp to the substantially L-shaped extension handle is by a pair of laterally projecting vertically spaced support arms which extend outwardly from one of the upstanding legs of the channel-shaped clamp. A vertically disposed thumb screw, preferably extending through the upper support arm, grips the L-shaped lower end of the handle extension between the arms when it is so positioned.

DETAILED DESCRIPTION OF PREFERRED EMBODIMENT

These and other objects, features and advantages of the invention will be more readily apparent from the following detailed description thereof, when read with reference to the accompanying drawings, in which:

FIG. 3 is a similar perspective view of the U-bolt holder of the invention having a U-bolt clamped therein;

FIG. 4 is a perspective showing of a U-bolt clamp adapter in accordance with the invention;

FIG. 5 is an elevational view of the adapter, to a slightly reduced scale; and

FIG. 6 is a plan view of the adapter shown in FIG. 5.

Figure 1:
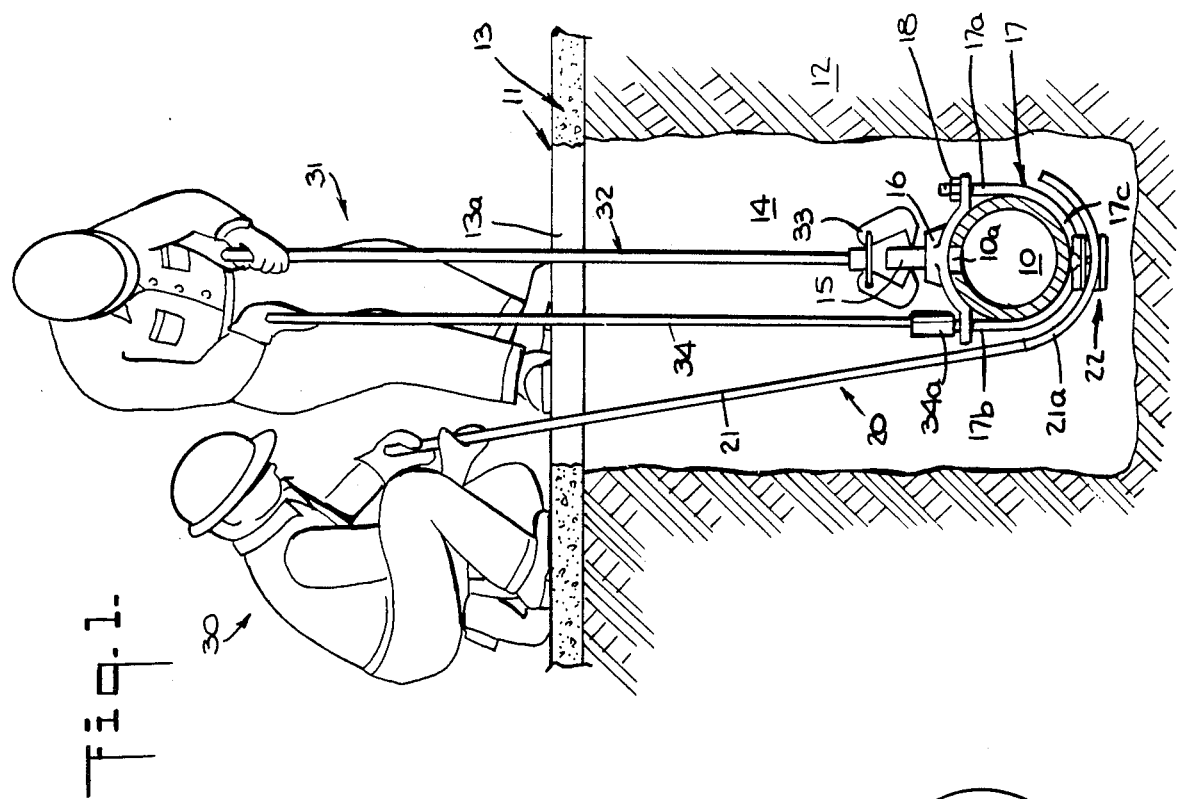
FIG. 1 is a perspective, sectional illustration of the method of positioning and holding a utility saddle U-bolt in accordance with the invention.
Figure 2:
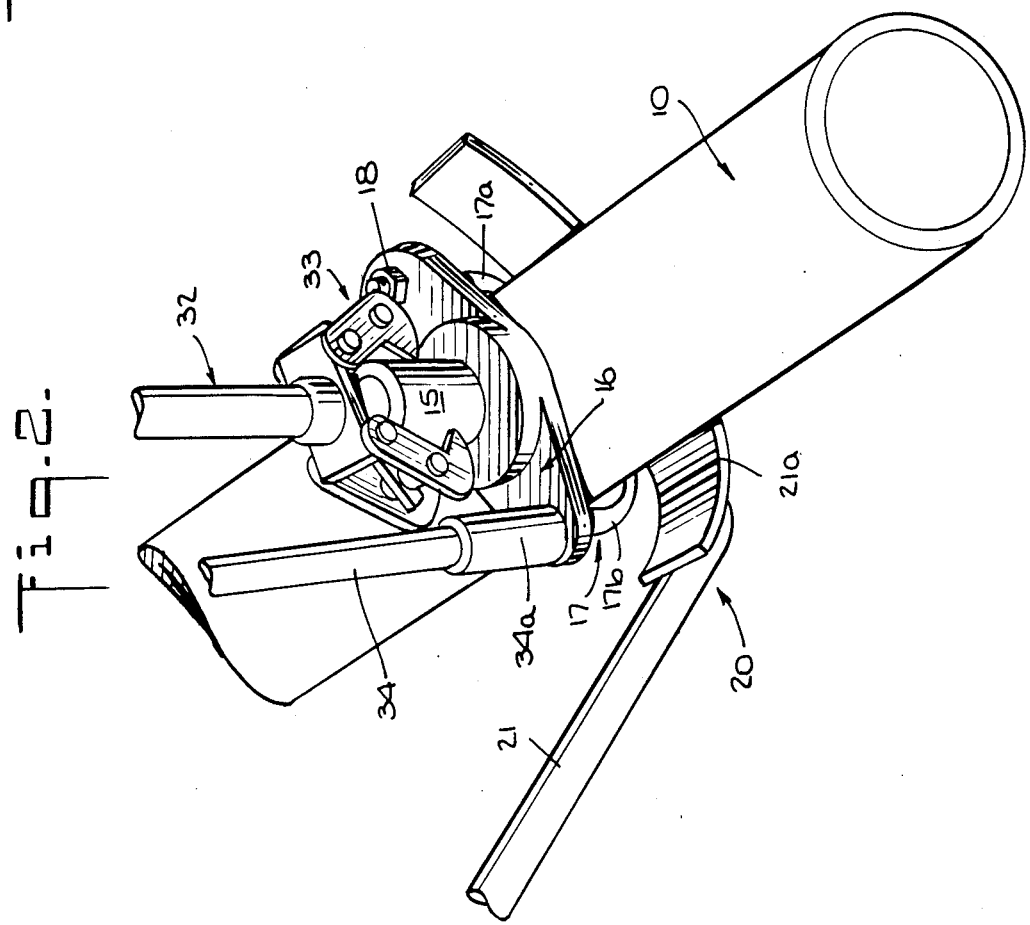
FIG. 2 is a perspective showing, to an enlarged scale, of a U-bolt and saddle as it is being connected on a gas main in accordance with the invention.

Referring first to FIGS. 1 and 2, those familiar with the manner in which natural gas is supplied to buildings such as residences and the like will understand that, at respective locations along an underground gas main, the main line of the system is tapped and a service line is attached to lead gas, tapped from the main into the building through its basement wall. In FIG. 1 an underground gas main 10, usually located three feet below street level 11, is normally buried in the earth 12. However, when a repair is to be made to the connection between the service line and the main, the hardened street surface 13 must be broken away, as at 13a, and the earth 12 must be excavated down to and below the main for convenient access to the repair point whereupon the gas main 10 is exposed within the excavation which is generally indicated by reference numeral 14.

As is also well known, the service line (not shown) is normally connected to the main 10 via a riser tee pipe fitting (not shown) which is attached to an upwardly projecting pipe nipple 15 which, in turn, is attached to a crown saddle 16 which is clamped over the tap hole 10a of the main 10 and sealed thereto by an O-ring (not shown). Thus, the normal flow of gas from the main 10 is upwardly through the tap hole 10a and the riser nipple or pipe 15, and thence through the riser tee (not shown) into the service line (not shown), in well known manner. The saddle 16 is clamped on to the main 10 by a saddle U-bolt, generally indicated by reference numeral 17, whose upwardly projecting leg portions 17a, 17b are threaded, and pass through respective openings (not numbered) in the saddle 16 to receive the nuts 18 (only one of which is shown) which tighten the saddle 16 on the U-bolt 17 to form the saddle connection about the main 10. The present invention provides a method and a tool for positioning and holding the U-bolt 17 when making this connection within a comparatively small-sized excavation opening 14, working from the above-ground level as seen in FIG. 1. The area of the opening of the excavation 14 at the street level 11 may be as small as about 2 feet long by 2 feet wide, which is formed by first breaking away the street, as at 13a, and then digging using spades or the like for loosening soil, and a vacuum for removing the loosened soil, as is now a conventional technique.

More particularly, with reference to FIGS. 1, 2 and 3, the utility service saddle U-bolt holder tool in accordance with the invention is generally indicated by reference numeral 20, and consists of an elongated handle 21 having a generally L-shaped lower end 21a to which a U-bolt clamp, which in the preferred embodiment is a U-bolt clamp adapter 22 (FIGS. 1 and 3), is attached. In the preferred embodiment, the elongated handle 21 is actually a "lower tape holder", which is a well known tool used applying sealing compound to a gas main, for subsequent compression into a leaking bell-joint. It is therefore normally carried by a gas service repair truck, and one of the advantages of the present invention in its preferred embodiment is that such tool may be used as a handle, so that only the clamp adapter 22 need be carried on the truck in order to utilize the present invention to hold U-bolts when replacing the saddles on gas mains using "small hole" techniques. That is, although curved in a generally semi-circular shape, the flat metal lower end 21a of the conventional lower tape holder has a radius such as will pass around the underside of the main 10 with adequate clearance from the adjacent upstanding U-bolt end 17b, (FIG. 1) as its handle portion 21 extends upwardly out of the excavation 14 to the above-ground level. Thus, using the clamp adapter 22, the lower tape holder tool is used to hold the U-bolt 17 in accordance with the invention.

Referring now to FIGS. 4, 5, and 6, the U-bolt clamp adapter 22 is generally channel-shaped as shown in FIGS. 4 and 5, having a body portion 22a and a pair of normally upward projecting, laterally spaced apart fixed channel-leg portions, each of which is indicated by reference numerals 22b and 22c, respectively. The spacing between the leg portions 22b and 22c is sufficient to accommodate the width of the middle length portion 17c (FIG. 3) of a U-bolt for an 8" saddle, which is the largest of the more commonly used sizes of saddles, and thus the clamp 22 will also hold U-bolts for 4" and 6" saddles which are also commonly employed. As indicated in FIGS. 3 and 4, the clamping of the middle length portion 17c of the U-bolt 17 within the clamp 22 is by direct engagement of a thumb-screw 23 which projects laterally through a threaded thumb-screw aperture 23b in the channel-leg 22c to within the channel area between the legs 22b, 22c, where its end 23a directly engages the crowned side edge 17d of the U-bolt, as seen in FIG. 3. It is generally known that the length of the middle body portion 17c of such U-bolts 17 has rounded or crowned side edges as at 17d and the location of the thumb screw 23, above the plane of the body portion 22a is such that the thumb screw 23a will engage such crown-shaped side edge 17d of the U-bolt, for a purpose as will be explained. Of course, the opposite side edge of the U-bolt is pressed against the channel-leg 22b when the U-bolt is clamped within the clamp 22, by manually tightening the thumb screw 23.

The clamp adapter 22 is attached to the substantially L-shaped lower end 21a of the elongated handle 21 by a pair of integrally formed upper and lower support arms 24a, 24b which project laterally outward, with respect to the channel-shape of the clamp, from the channel-leg portion 22b, as seen particularly in FIGS. 4 and 5. As will be understood particularly from FIGS. 1 and 3, the vertical spacing distance between the parallel, horizontally disposed support arms 24a, 24b is such as to accommodate the curvature of the middle length portion 17c of the lower end 21a of the tape holder 21, or the similar lower end of any other tool to which the clamp adapter may be expected to be attached. As illustrated, the upper support arm 24a carries a thumb screw 25 which is tightenable against the lower end 21a of the handle when it is positioned between the arm 24a, 24b, to securely retain the engagement between the clamp adapter 22 and the handle 21.

Referring now to the manner in which the U-bolt holder tool 20 is used, as seen in FIG. 3 the U-bolt 17 is first clamped within the U-bolt clamp 22 by tightening the thumb screw 23 against its rounded or crowned side edge 17d along its middle body portion 17c, and the clamp 22 is mounted and tightened securely on the lower end 21a of the elongated handle 21, by tightening the thumb screw 25 to secure the handle lower end 21a between the support arms 24a, 24b, as will be understood. Referring to FIG. 1, a repairman 30, working at street level 11, extends the tool 20 down into the excavation 14, with the U-bolt 17 mounted thereon as aforesaid, and manipulates the U-bolt to its intended location projecting upwardly from beneath the gas main 10 with its threaded end portions 17a, 17b projecting upwardly adjacent to the gas main 10 on either side thereof. Using a plugged gripper tool 32 whose lower end has a gripper clamp 33 thereon, another repairman 31 lowers the saddle 16 into position on top of the tap hole 10a, holding the saddle 16 by its attached, upwardly projecting riser nipple 15 using the gripper clamp 33, as shown. He lowers the saddle 16 so that its respective side apertures engage and move downwardly over the upwardly projecting threaded U-bolt ends 17a, 17b and, as will be understood, the repairman 30 may be called upon to manipulate the position of the U-bolt 17 so that the saddle 16 is accurately placed over the tap hole 10a. The repairman 31 then mounts one of the bolts 18 within the socket end 34a of a drive socket extension tool 34, which is of a known type, and lowers the nut into the excavation 14 to be threadably engaged on one of the upstanding legs 17a or 17b of the U-bolt, as illustrated in FIGS. 1 and 2. After the first of such nuts 18 is tightened in place, the repairman 31 places a second nut 18 in the socket portion 34a and threads it on to the other upstanding leg of the U-shape in similar manner, to complete the connection. Of course, the nuts 18 are tightened as necessary, and the plug gripper tool 32 is released and withdrawn from the hole.

The previously referred to crown-shaped side edges 17d of the middle body portion 17c of a conventional saddle U-bolt, together with the positioning of the thumb screw 23 on the channel-leg 22c so that its centerline coincides with the mid-point of such crown-shaped side edge 17d of the U-bolt middle body portion 17c, provides a quick-release feature of the tool of the present invention. That is, after the saddle and U-bolt have been tightened around the gas main 10 as previously described and as illustrated in FIG. 1, it is of course necessary to disconnect the tool 20, including its clamp adapter 22, from the U-bolt middle body portion 17c. To do so, one of the repairmen 30 sharply urges the tool 20 downwardly, as by pushing hard in the downward direction thereon, whereupon the thumb screw 23a will slide off and disengage the crown-shaped side edge 17d of the U-bolt middle body portion 17c. The tool 20 is then conveniently lifted out of the excavation 14, and the U-bolt attachment of the saddle is complete.

Thus has been described a utility saddle U-bolt holder, and a method of using the same, which achieve all of the objects of the invention.

What is claimed is:

1. A utility service saddle U-bolt and holder for connecting the U-bolt to a saddle, comprising an elongated, manually manipulable handle which is generally vertically disposed during use and having a projecting lower end which is disposed substantially horizontally during use to thereby provide respective upwardly and downwardly facing surfaces and laterally oppositely facing sides, a saddle U-bolt clamp having handle attachment means releasably attached to and projecting laterally from one of said sides of said lower end of the handle, said clamp comprising a body portion disposed generally horizontally during use and having laterally opposite sides and a pair of laterally spaced apart channel-leg portions respectively on said opposite sides of said body portion and disposed vertically during use thereby providing a substantially upwardly facing channel-shaped clamp for receiving said U-bolt, and laterally disposed, manually tightenable thumb-screw means on and extending through one of said channel-leg portions for engaging and temporarily retaining said U-bolt within said clamp, said clamp handle attachment means comprising a pair of normally horizontally disposed, vertically spaced apart upper and lower support arms on and projecting laterally outward from the other of said channel-leg portions of said clamp and receiving said upwardly and downwardly facing surfaces of said handle lower end therebetween, and vertically disposed, manually tightenable thumb-screw means on and extending through said upper support arm into retaining engagement with said upwardly facing surface of said handle lower end, said lower support arm and said clamp body portion being substantially aligned within the same plane, and a U-bolt received in and held by said clamp thumb-screw means at a middle-length location along the U-bolt within said upwardly facing channel-shaped clamp with the legs of the U-bolt projecting upwardly and aligned parallel to the plane of said handle and its said lower end.

2. A utility service saddle U-bolt holder according to claim 1, wherein said U-bolt within said channel-shaped clamp has substantially crowned side edges extending along its said middle length location, said clamp thumb-screw means engaging one of said crowned side edges of said U-bolt thereby providing a minimal contact area therebetween.

* * * * *